United States Patent [19]

Caflisch

[11] 4,072,061

[45] Feb. 7, 1978

[54] ROLLER DRIVE ASSEMBLY FOR PHOTOGRAPHIC PROCESSORS

[75] Inventor: Jerry A. Caflisch, Minneapolis, Minn.

[73] Assignee: Pako Corporation, Minneapolis, Minn.

[21] Appl. No.: 658,540

[22] Filed: Feb. 17, 1976

[51] Int. Cl.[2] .......... F16H 21/14

[52] U.S. Cl. .......... 74/67; 354/321

[58] Field of Search .......... 100/172, 161, 176; 105/120; 354/321, 322; 74/67

[56] References Cited

U.S. PATENT DOCUMENTS

| | | | |
|---|---|---|---|
| 386,942 | 7/1888 | Thomas | 74/67 |
| 833,626 | 10/1906 | Pifer | 354/322 |
| 1,899,589 | 2/1933 | Sanborn | 105/120 |
| 3,495,520 | 2/1970 | Schumacher | 354/321 |

FOREIGN PATENT DOCUMENTS

| | | | |
|---|---|---|---|
| 1,387,375 | 12/1964 | France | 351/321 |

*Primary Examiner*—Benjamin W. Wyche

*Assistant Examiner*—Wesley S. Ratliff, Jr.

*Attorney, Agent, or Firm*—John W. Adams

[57] ABSTRACT

A roller drive assembly particularly designed for conveying photographic material through a processor unit and including a plurality of transport rollers positioned to define a predetermined path for a strip of photographic material, certain of said rollers having their axes coplanar and parallel to each other and one of said coplanar rollers being connected to a source of rotational power, one set of crank arms being respectively fixed to one end of said coplanar rollers and disposed in parallel relation to each other and a second set of crank arms fixed to the other end of said coplanar rollers and disposed in parallel relation to each other, a connecting bar pivotally connected the crank arms in each set to maintain the parallel relation of the arms in each set and to provide positive driving connections between the coplanar rollers set, said sets of crank arms being disposed in sufficiently out-of-phase relation to each other to prevent said connecting bars from moving over center and reversing the driving direction of some of said coplanar rollers.

4 Claims, 5 Drawing Figures

ROLLER DRIVE ASSEMBLY FOR PHOTOGRAPHIC PROCESSORS

BACKGROUND OF THE INVENTION

In the photographic processing industry, strips of photographic sheet material are commonly transported through processing machines by roller trains positioned to provide the desired transport path. It is necessary to have each of the rollers positively driven at a uniform speed to prevent slippage of the material on said rollers and to provide uniform driving force and speed as well as generally constant tension along the entire length of said strip. Several driving mechanisms have been developed heretofore, none of which are totally satisfactory. One type of mechanism employs gear trains connecting the rollers in an assembly and is complex and cumbersome, especially if the transport roller assembly is of substantial length. Another type of mechanism uses rotary crank arms, all respectively connected to the same ends of the rollers. The crank arms are connected in parallel relation by a single connecting bar to apply rotational power to only one end of the rollers. Due to play in linkages between the respective arms and the connecting bar, the arms may move out of parallel relationship with each other (especially with long roller trains and transport paths) and as a result the connecting bar may be on one side of the center of some rollers and on the other side of the center on other rollers. This condition occurs when the arms are in a substantially vertical position, and causes a reversal of rotational direction of some of the rollers which renders the drive linkage inoperative.

This invention prevents such a reversal of rotational direction by transferring the power from the top to the bottom of the transport on both ends of the rollers by the use of two sets of parallel crank arms and two connecting bars, one bar on each end of the transport rollers with each set of crank arms being is sufficiently out-of-phase relationship to each other so that when one set of crank arms is in its ambiguous vertical position the other set positively maintains the direction of rotation and substantially constant torque is applied to the rollers connected to the respective arms regardless of crank arm position.

Figure 2:
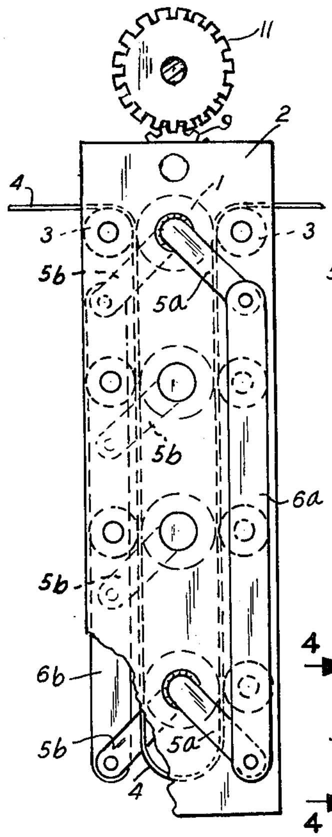
FIG. 2 is a left side elevational view of said transport roller assembly with portions broken away.
Figure 1:
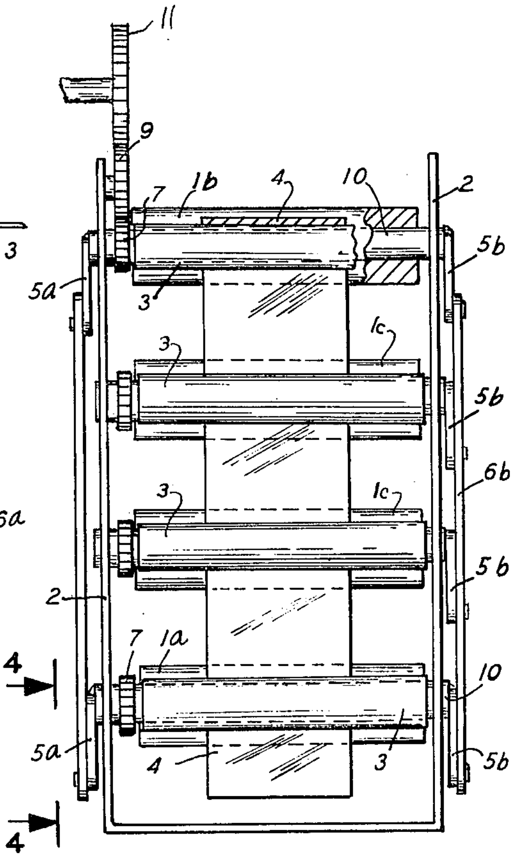
FIG. 1 is a front elevational view of a transport roller assembly embodying this invention.
Figure 3:
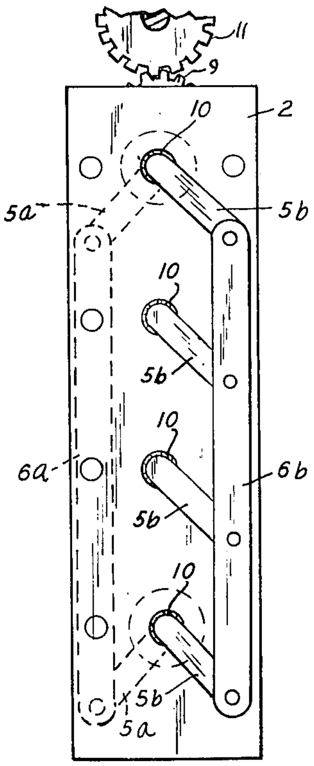
FIG. 3 is a right side elevational view of the assembly.
Figure 4:
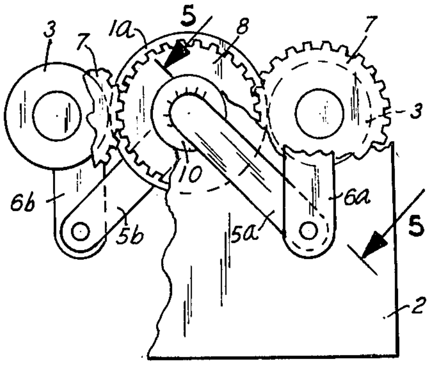
FIG. 4 is a fragmentary side elevational view of the assembly taken substantially along the line 4—4 of FIG. 1.
Figure 5:
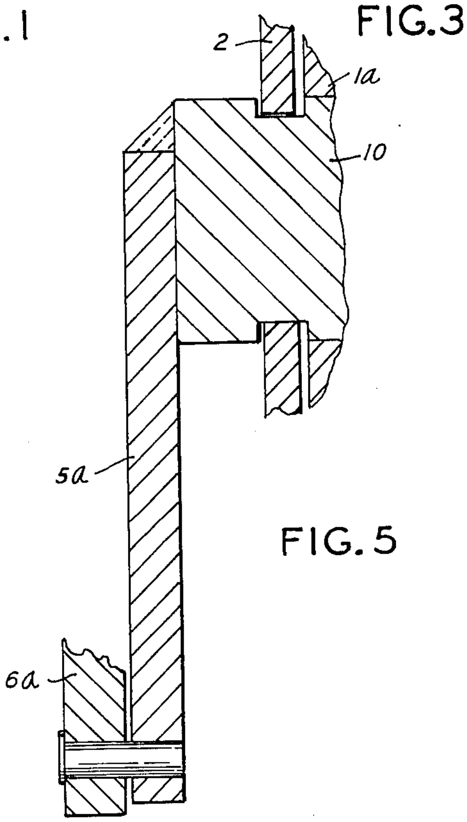
FIG. 5 is a fragmentary sectional view taken substantially along the line 5—5 of FIG. 4.

Referring to FIG. 1, lower and upper driving rollers 1*a* and 1*b* are positioned in parallel coplanar relation to each other and are rotatably supported between a pair of spaced apart support plates 2. Two driven rollers 3 are positioned on opposite sides of each driving roller 1*a* and 1*b* in closely spaced parallel relation thereto defining a transport path along which a strip of material 4 is transported. Said rollers 3 are also rotatably supported by plates 2. As illustrated in FIG. 2, two sets of crank arms 5*a* and 5*b* are respectively fixed to the opposite end of a shaft 10 extending through each of the driving rollers 1*a* and 1*b*. The arms 5*a* are parallel to each other as are the arms 5*b* and in the form shown, one set is substantially perpendicular to the other. The arms 5*a* at one end of the rollers 1*a* and 1*b* are pivotally connected by one connecting bar 6*a*, while the arms 5*b* are pivotally connected by another connecting bar 6*b*. FIG. 4 shows a gear 7 attached to one end of each of the two driven rollers 3 and meshing with a gear 8 attached to the corresponding end of driving roller 1*a* to transmit rotary driving force to said driven rollers 3. Upper driving roller 1*b* and the corresponding driven rollers 3 are similarly interconnected. Additional sets of driving rollers 1*c* and driven rollers 3 may be intermediately spaced between driving rollers 1*a* and 1*b* and connected by crank arms 5*b* to bar 6*b* as shown.

In typical operation, a strip of photographic material 4 is threaded between the rollers 1 and 3 along the substantially U-shaped transport path as shown in FIG. 2. A source of rotational power is connected to the uppermost driving roller 1, such as gear 11 driving gear 9 which is meshed with the upper gear 8 attached to the upper driving roller 1*b* as shown in FIG. 1. When the gear 9 rotates, the roller 1*b* connected therewith also rotates, forcing the upper arms of the sets 5*a* and 5*b* attached to opposite of that roller to be rotated. This causes the bars 6*a* and 6*b* to describe a generally elliptical path, forcing all other arms 5*a* and 5*b* connected thereto to be rotated in a circular path. Thus, all the driving rollers 1*a* 1*b* and 1*c* will be driven by said bars 6*a* and 6*b* at the same speed and will in turn drive the rollers 3 through the gears 7 and 8 to transport the strip along said path.

If only one set of arms are used, the torque exerted upon the driving rollers would be at a minimum when the arms are in a vertical position. With normal manufacturing tolerances play exists in the linkage between the arms and the connecting bar, and could result in some of the arms being on the left side of a center line drawn through the axes of the driving rollers while other arms are still on the right side of said center line. Thus, with only a single bar, as the bar is moved upwardly the driving rollers whose corresponding arms are on the left hand side line will rotate in a clockwise direction, while those driving rollers whose corresponding arms are on the right hand side of said line will rotate in a counterclockwise direction. This prevents the operation of the assembly, and could damage the mechanism.

In the form of the invention illustrated (with the arms 5*a* being disposed at 90° out-of-phase relationship to the arms 5*b*) the torque exerted upon the rollers 1*a*, 1*b* and 1*c* will remain substantially constant regardless of arm position. Even when one set of arms 5 is in a vertical position, the other set will be substantially horizontal, delivering maximum torque to the rollers 1*a*, 1*b* and 1*c* and, therefore, preventing the play in the linkages of the vertical arms from causing the reversal of the rotational direction of some of the rollers. It is, of course, apparent that the two sets of arms do not have to be perpendicular to each other to eliminate the over center reversed problem, but to allow for normal production line variations in the linkage play between the arms and the respective bars, and out-of-phase angle range of between 10° to 170° has been found to be acceptable. It is not necessary to have crank arms connected to both ends of intermediate rollers 1*c* since the linkage play is adequately countered by using two arms 5*a* and 5*b* on rollers 1*a* and 1*b*, but is is, of course, obvious that a crank arm may be fixed to each end of the rollers 1*c* without departing from the teaching of the present invention.

It will of course be understood that various changes may be made in the form, details, arrangement and proportions of the parts without departing from the scope of this invention as set forth in the appended claims.

I claim:

1. In a photographic processor unit, a roller assembly for conveying photographic sheet material through the photographic processor unit at an essentially uniform speed without slippage and with generally constant tension along the photographic sheet material's entire length, said assembly comprising a plurality of transport rollers positioned to define a predetermined path for engaging and transporting photographic sheet material through the processor unit, certain of said rollers having their axes disposed in parallel coplanar relation, one set of crank arms respectively fixed to corresponding ends of said coplanar rollers and disposed in parallel relation to each other.

a second set of crank arms respectively fixed to the opposite ends of said coplanar rollers and disposed in parallel relation to each other, a pair of connecting bars respectively pivotally connected to said two sets of crank arms for driving said coplanar rollers, said two sets of crank arms being disposed in sufficiently out-of-phase relation with respect to the other set of crank arms to prevent an over center reversal of the driving direction of said coplanar rollers, and means for supplying rotary driving power to one of said rollers, whereby the photographic sheet material is transported through the photographic processor unit along the predetermined path.

2. The structure set forth in claim 1 wherein said transport rollers also includes driven rollers disposed on opposite sides of said coplanar rollers to define opposite sides of a U-shaped transport path with means for transporting the strip material around the lower portion of said path, and having driving means connecting said coplanar roller with said driven rollers to rotate the driving and driver roller simultaneously.

3. The structure set forth in claim 1 and the out-of-phase relationship between the two sets of crank arms being between 10° and 170°.

4. The structure set forth in claim 1 wherein the out-of-phase relationship between two sets of crank arms is substantially equal to 90°.

* * * * *